(12) United States Patent
Zheng

(10) Patent No.: US 7,689,528 B2
(45) Date of Patent: Mar. 30, 2010

(54) METHOD AND APPARATUS FOR A SCALABLE ALGORITHM FOR DECISION OPTIMIZATION

(75) Inventor: Maolin Zheng, Piedmont, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 279 days.

(21) Appl. No.: 11/177,517

(22) Filed: Jul. 7, 2005

(65) Prior Publication Data
US 2006/0020564 A1    Jan. 26, 2006

Related U.S. Application Data

(60) Provisional application No. 60/586,525, filed on Jul. 9, 2004.

(51) Int. Cl.
*G06N 5/02* (2006.01)
*G06E 1/00* (2006.01)
*G06E 3/00* (2006.01)
*G06G 7/00* (2006.01)
*G06F 9/44* (2006.01)
*G06F 17/50* (2006.01)

(52) U.S. Cl. ............................... 706/46; 706/19; 705/7
(58) Field of Classification Search .................. 706/13, 706/46, 8, 12, 45
See application file for complete search history.

(56) References Cited

U.S. PATENT DOCUMENTS

| | | | |
|---|---|---|---|
| 5,710,915 | A | 1/1998 | McElhiney |
| 6,185,543 | B1 | 2/2001 | Galperin et al. |
| 6,564,221 | B1 | 5/2003 | Shaidal |
| 6,640,215 | B1 | 10/2003 | Galperin et al. |
| 6,873,979 | B2 | 3/2005 | Fishman et al |
| 6,925,441 | B1 | 8/2005 | Jones, III et al. |

(Continued)

FOREIGN PATENT DOCUMENTS

JP        1993-128093        5/1993

(Continued)

OTHER PUBLICATIONS

'Linear Programming': Llewellyl, 1964, Holt, Rinehart & Winston, pp. 105-111.*

(Continued)

*Primary Examiner*—David R Vincent
*Assistant Examiner*—Peter Coughlan
(74) *Attorney, Agent, or Firm*—Mintz, Levin, Cohn, Ferris, Glovsky and Popeo, P.C.

(57) ABSTRACT

An iterative approach to solving the optimization problem is provided. The invention provides an iteration of four basic operations; determining the segments, balancing the segments, expanding a segment, and solving the segment optimization. The method and apparatus can use any off-the-shelf linear programming (LP) solver, such as Dash Optimization Xpress, by Dash Optimization, during the solve operation. The size of the problem fed into the LP solver remains bounded and relatively small compared to the entire problem size. Thus, the algorithm can solve problems of several orders of magnitude larger. In one embodiment of the invention, the sampling and segmentation techniques are removed to where the problem is solved at the account-level. In the above cases, the solution is produced in a more cost-effective manner and the best possible return is achieved because the doubt of achieving a true global solution is removed.

8 Claims, 4 Drawing Sheets

U.S. PATENT DOCUMENTS

| | | | |
|---|---|---|---|
| 6,993,493 | B1 | 1/2006 | Galperin et al. |
| 2003/0110112 | A1* | 6/2003 | Johnson et al. ............... 705/36 |
| 2003/0125818 | A1* | 7/2003 | Johnson ....................... 700/28 |

FOREIGN PATENT DOCUMENTS

| | | |
|---|---|---|
| JP | 2001-184334 | 7/2001 |
| JP | 2003-526139 | 9/2003 |
| JP | 2003-527648 | 9/2003 |
| WO | WO0111522 | 2/2002 |

OTHER PUBLICATIONS

'System identification using balanced parameterizations': Chou, 1997, IEEE, 0018-9286/97, pp. 956-974.*

'Structured programming': Dahl, 1972, Academic press, p12, 19, 33.*

Vasek, Chvatal; Linear Programming, W. H. Freeman and Comapny, 1980.

M.A. Trick, A Linear Relaxation Heuristic for the Generalized Assignment Problem, GSIA Working Papers, Carnegie Mellon University, 89-90-06, 1990.

I.R. De Farias, Jr and G.L. Nemhauser, A Family of Inequalities for the Generalized Assignment Polytope, Optimization Online Digest, Dec. 2000.

D.G. Cattrysse and L.N. Van Wassenhove, A Survey of Algorithms for the Generalized Assignment Problem, WJOR 60 (1992), 260-272.

Arthur, J. L. et al. "PAGP, A Partitioning Algorithm for (Linear) Goal Programming Problems," ACM Transactions of Mathematical Software, 6:3, Sep. 1980, pp. 378-386.

Sridhar, U. et al. "Data Partitioning Schemes for the Parallel Implementation of the Revised Simplex Algorithm for LP Problems," Parallel Processing Symposium, 1993, Proceedings of Seventh International Apr. 13-16, 1993, pp. 379-383.

* cited by examiner

METHOD AND APPARATUS FOR A SCALABLE ALGORITHM FOR DECISION OPTIMIZATION

CROSS-REFERENCE TO RELATED APPLICATIONS

This application claims priority to U.S. Provisional Patent Application Ser. No. 60/586,525, filed on Jul. 9, 2004, which application is incorporated herein in its entirety by the reference thereto.

BACKGROUND OF THE INVENTION

1. Technical Field

The invention relates generally to optimization techniques. More particularly, the invention relates to a computer implemented method and apparatus for providing an optimal solution for a large consumer decision.

2. Description of the Prior Art

A large consumer decision is characterized by a decision made for millions of accounts with one or more global constraints. The inclusion of the global constraints means that the decisions for all accounts must be examined all together. Such problem in academics has been labeled an NP-hard problem (it is formulated as a 0,1-linear program), because the combinations exponentially rise based on the number of accounts and the number of decision alternatives for each account. A typical solution to the problem can be described with reference to FIG. 1, a schematic block diagram showing components of a solver for a consumer decision according to the prior art. Samples or segments of account 2 data are provided as input into a calculator 4 which consists of user defined scoring functions and system functions. The output of the calculator is used to construct the objective, constraints of the 0,1-linear program of the consumer decision model. The relaxation of the linear program is the input to a linear program (LP) solver 8. The LP solver outputs a solution which might contains fractions 10. It should be appreciated that some custom solvers enforce a limitation on the number of variables or type of constraints allowed.

This problem has been around for the last ten years, i.e. since the consumer-marketing sector started to look at using optimization algorithms to assist with decisions on what to offer consumers. The credit card industry, for example, has been a leader in applying these algorithms.

The current approach in the industry uses sampling and segmentation techniques when applying optimization algorithms to large scale consumer decisions that include global constraints. In sampling techniques, the solution depends on the quality of the samples. In segmenting techniques, the solution depends on the quality of the segments. Such sampling and segmentation techniques are used due to limitations of existing optimization algorithms and computer memory. Most algorithms require the entire problem to be loaded into memory. These decision problems do not fit into a 32 bit address space. On occasion custom code has been written that may reduce the problem in other ways, such as only requiring one global constraint and narrowing the solution to solve only one specific type of decision. Another approach includes using 64 bit computers. However, such computers are expensive and the solvers are either new or inexperienced.

It should be appreciated that all such approaches achieve varying degrees of success, depending on the experience of the people applying the approaches and the applicability of the sampling, segmentation, and/or problem reduction techniques. None are fully acceptable for today's projects.

Y. Galperin, V. Fishman, and L. Gibiansky, *Method for Optimizing Net Present Value of a Cross-Selling Marketing Campaign*, WO0111522 (published Feb. 15, 2001) discuss an iterative algorithm to the problem of multidimensional optimization of cross-selling. The techniques discussed therein describe a solution by supplying a non-linear mathematical formulation, the non-linearity being due to introducing the Lagrange multipliers, to the traditional linear multidimensional problem desired to be solved when offering a large number of promotions M to a very large set of prospective customers N. Such process consists of randomly selecting a statistically significant sample of a prospect list, calculating the value of a utility function for each pair of an offer and selected prospects, reducing the original linear multidimensional problem to a smaller problem (still linear) with a feasible number of dimensions, solving the smaller problem for the selected sample numerically with the desired tolerance using an iterative algorithm, and using the results to calculate a set of offers in one pass for the full prospect list. It should be appreciated that Galperin, et al only use a sample of data, not all of the data, and do not guarantee the optimality, just a solution.

It would be advantageous to solve very large optimization problems at the account level.

It would be advantageous to provide an algorithm that takes advantage of the structure for the consumer decisions and the criteria used to evaluate the decisions, and, such that while taking all data into consideration, the algorithm formulates a much smaller problem to feed a solver.

It would be advantageous to provide a method and apparatus where the size of the problem fed to a solver can be configured.

It would be further advantageous to provide an algorithm that is able to find the global solution to the problem initially posed, even with the smaller problem fed to the solver.

It would be advantageous to provide a solver that removes the dependencies on third parties.

SUMMARY OF THE INVENTION

An iterative approach to solving the optimization problem is provided. Each iteration solves a relatively small sub-problem compared to the entire problem size. Yet, the algorithm still finds the global solution to the problem initially posed, thereby allowing better approximation to the overall large consumer decision problem. In a consumer decision model, a client/customer is represented by a row record. A partition of row records of the entire problem into disjoint sub-sets is called a row partition. An element in a row partition is called a segment. The invention provides an iteration of four basic operations; determining a row partition, balancing the row partition, expanding selected segments to create a new row partition, and solving the newly created row partition. The method and apparatus can use any off-the-shelf linear programming solver, such as Dash Optimization Xpress by Dash Optimization, during the solve operation. The size of the problem fed into the solver remains bounded and can be reduced to where heavyweight solvers like Xpress and ILOG CPLEX by ILOG, Inc. are not required, thus removing dependency of third parties. It should be appreciated that such solvers add special heuristics to address large complex problems. The size of the problem fed into the solver remains bounded and relatively small compared to the entire problem size. Thus, the algorithm can solve problems of several orders of magnitude larger. This ability to solve larger problems enables existing sampling and segmentation approaches to use more samples and segments, thereby providing a more precise solution. In one embodiment of the invention, the sampling and segmentation techniques are removed to where the problem is solved at the account-level. In the above cases, the solution is produced in a more cost-effective manner and the best possible return is achieved because the doubt of achieving a true global solution is removed if the solver called within the algorithm returns an optimal solution.

DETAILED DESCRIPTION OF THE INVENTION

An iterative approach to solving the optimization problem is provided. Each iteration solves a relatively small sub-problem compared to the entire problem size. Yet, the algorithm still finds the global solution to the problem initially posed, thereby allowing better approximation to the overall large consumer decision problem. In a consumer decision model, a client/customer is represented by a row record. A partition of row records of the entire problem into disjoint sub-sets is called a row partition. An element in a row partition is called a segment. The invention provides an iteration of four basic operations; determining a row partition, balancing the row partition, expanding selected segments to create a new row partition, and solving the newly created row partition. The method and apparatus can use any off-the-shelf linear programming solver, such as Dash Optimization Xpress by Dash Optimization, during the solve operation. The size of the problem fed into the solver remains bounded and can be reduced to where heavyweight solvers like Xpress and ILOG CPLEX by ILOG, Inc. are not required, thus removing dependency of third parties. It should be appreciated that such solvers add special heuristics to address large complex problems. The size of the problem fed into the solver remains bounded and relatively small compared to the entire problem size. Thus, the algorithm can solve problems of several orders of magnitude larger. This ability to solve larger problems enables existing sampling and segmentation approaches to use more samples and segments, thereby providing a more precise solution. In one embodiment of the invention, the sampling and segmentation techniques are removed to where the problem is solved at the account-level. In the above cases, the solution is produced in a more cost-effective manner and the best possible return is achieved because the doubt of achieving a true global solution is removed if the solver called within the algorithm returns an optimal solution.

Commercial Advantage

It should be appreciated that a commercial advantage is provided that allows an enterprise and its customers to solve existing problems with more precision, thereby providing the customers with a greater return. If an enterprise currently employs sampling or segmentation techniques, then one embodiment of the invention allows such projects to use many more samples or segments, possibly an order of magnitude of more samples or segments. Furthermore, an enterprise and its customers can begin to address projects that require account-level decisions with global constraints, such as cross-sell. Current techniques cannot adequately address such projects due to the type of local constraints required, which forces true account level optimization. Current techniques being applied to cross-sell use sampling, segmentation, approximations, or a reduction in ability, such as using only one global constraint, such as volume.

Overview

Figure 1:
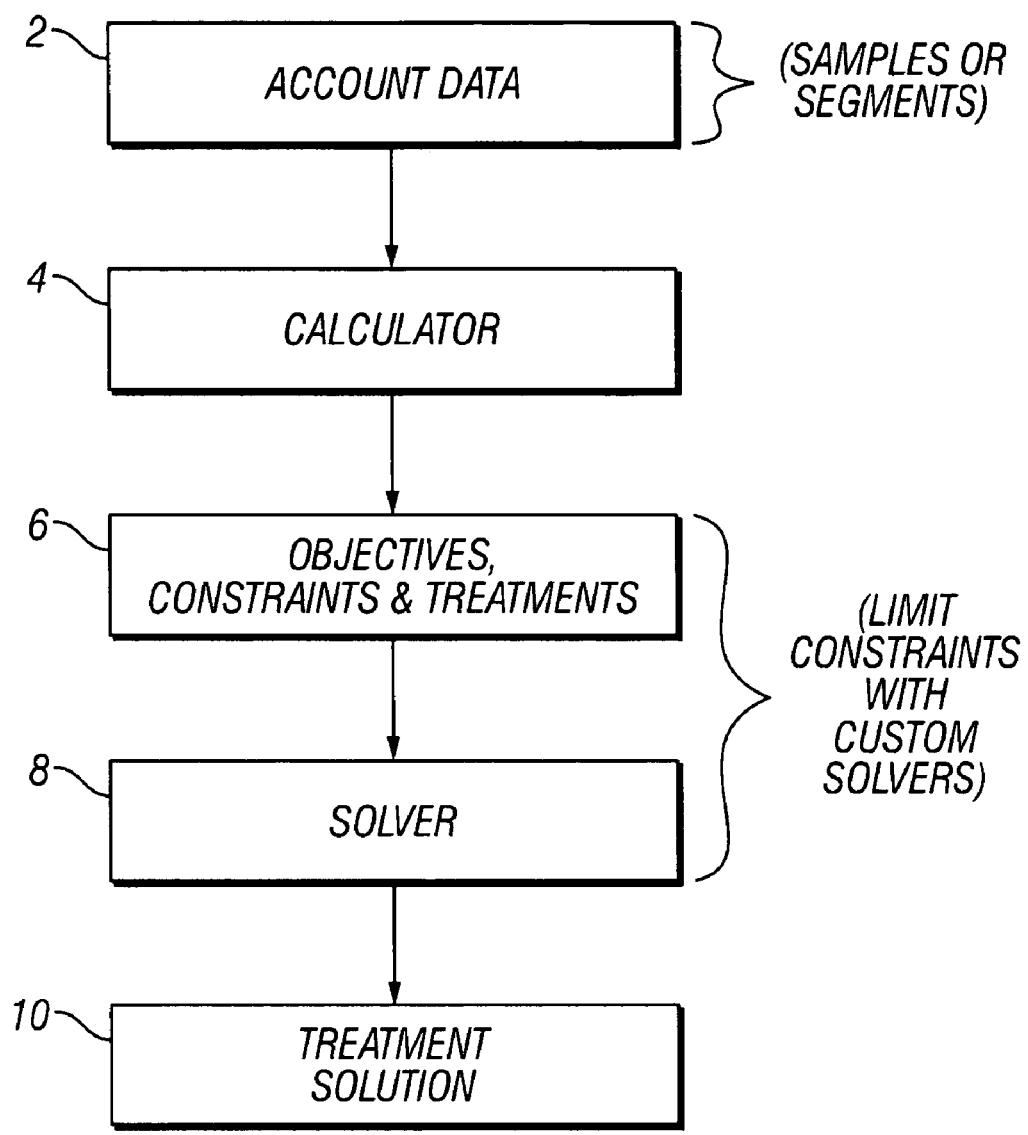
FIG. 1 is a schematic block diagram showing components of a solver for a consumer decision according to the prior art.
Figure 2:
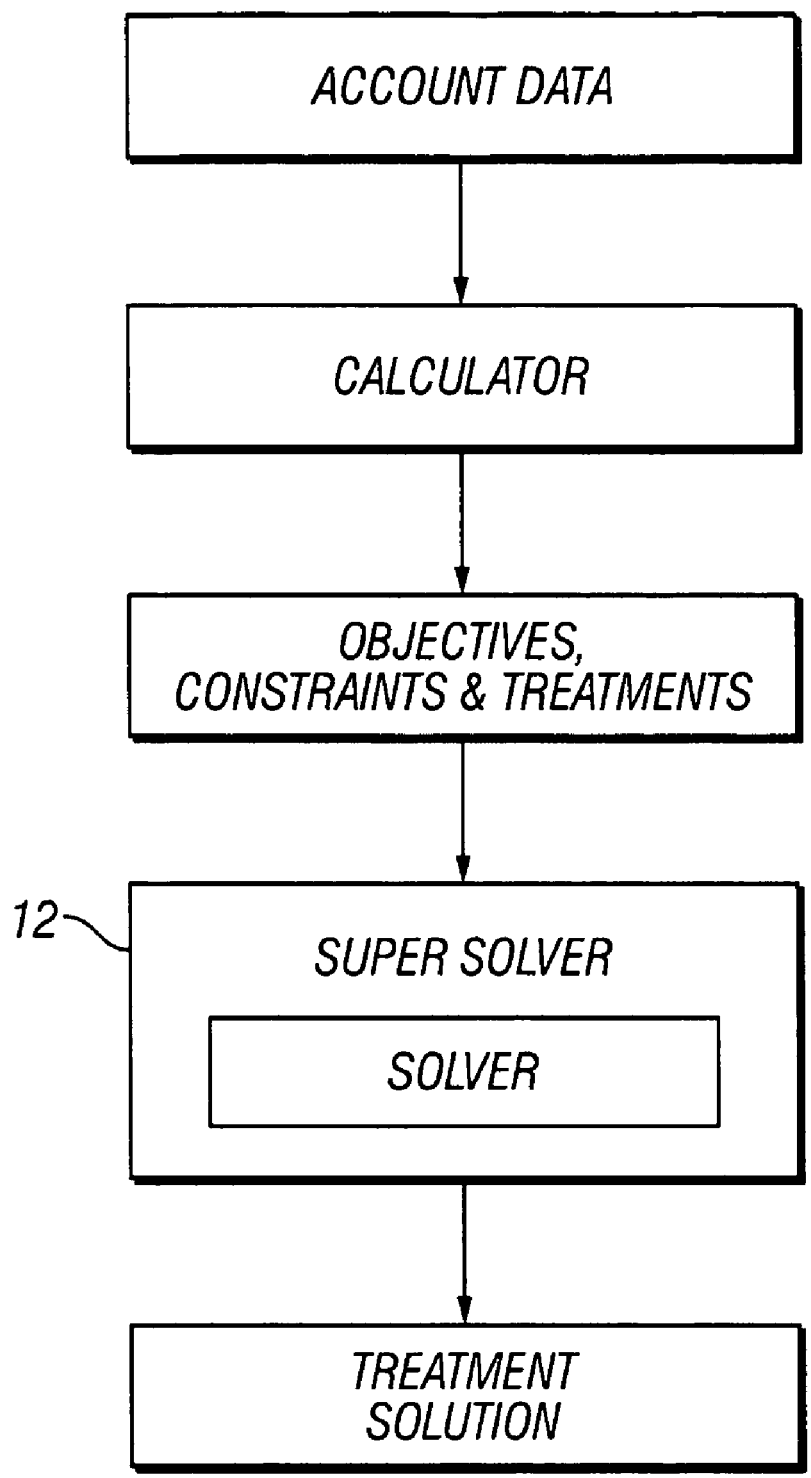
FIG. 2 is a schematic block diagram showing the solver for a large consumer decision according to the invention.

One embodiment of the invention can be described with reference to FIG. 2, a block schematic diagram showing the solver 12 for a large consumer decision according to the invention.

One embodiment of the invention provides the following features:

It wraps existing solvers;
It can be used on all processing levels:
    account;
    sample; and
    segment.
It uses four main operations in an iterative manner:
    finding a row partition;
    balancing the row partition;
    expanding the row partition to create a new row partition; and
    solving the newly created row partition.

Figure 3:
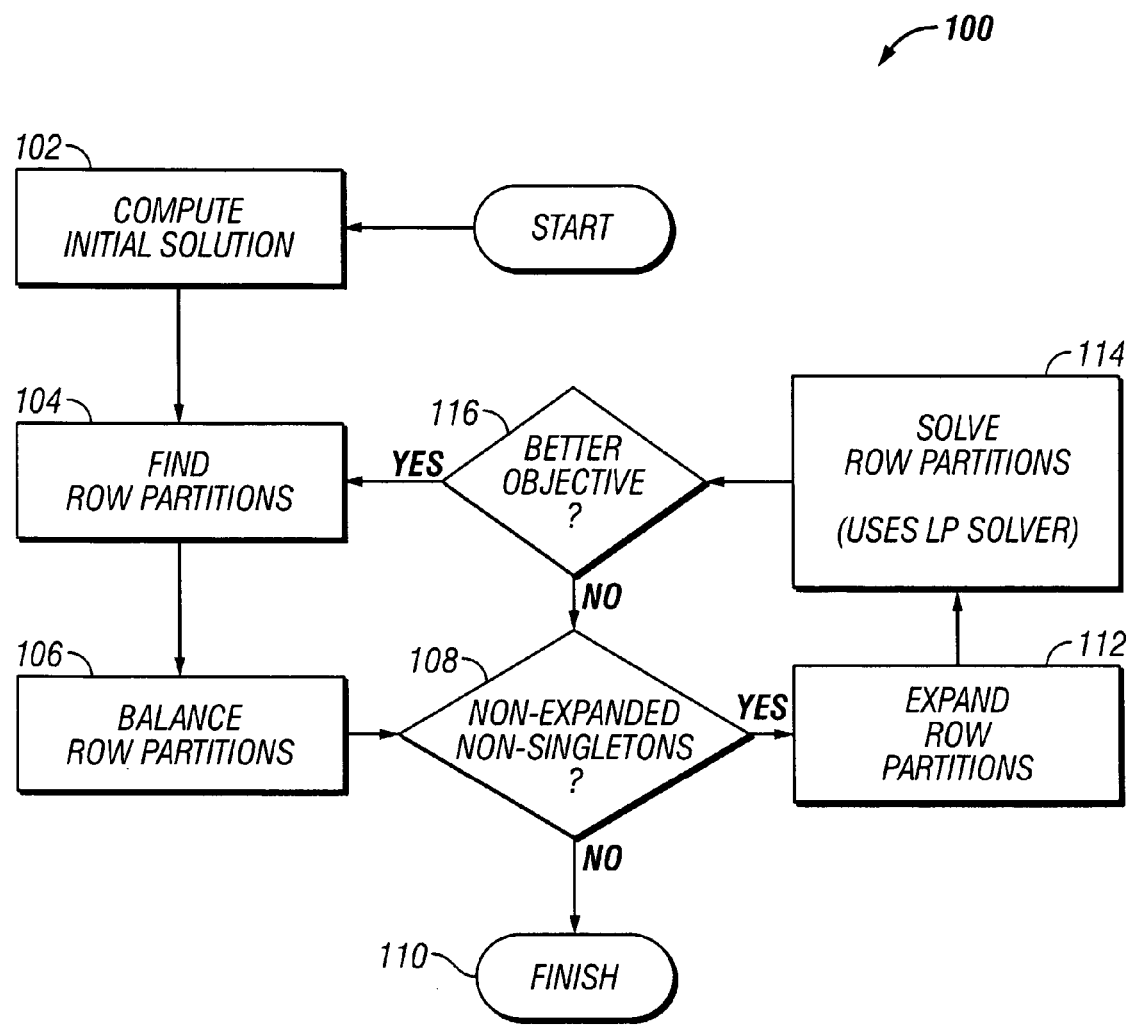
FIG. 3 is a flow diagram of the scalable exact algorithm according to the invention.

A high level flow of one embodiment of the invention can be described with reference to FIG. 3, a flow diagram of the scalable exact algorithm 100. The algorithm begins by computing an initial solution of the input problem (102). Set the initial solution as the current solution. Then the algorithm proceeds with the following: (1) Determines, or finds, a row partition based on the current solution (104). (2) After finding a row partition, balances the row partition (106). In the balanced row partition, marks all non-singleton segments as non-expanded or "usable". (3) Determines in among the segments weather there are any usable segments (108). If not, then the algorithm ends (110). (4) If there are usable segments, then selects a limited number (preconfigured) of such segments and expands them to singletons (112). A new row partition is produced. (5) Applies a solver to solve the newly created row partition (114). Then, given the solved row partition, the algorithm determines if a better objective function value or better solution is obtained (116). If yes, the algorithm uses the returned solution from the solver to update the current solution, and goes to (1). If not, control goes to (3).

An Exemplary Scalable Algorithm

The algorithm proposed here is for the account level formulation and can be applied to sample-weighted and segment formulations. For simplicity, we assume that there is no exclusion of treatments from any account. If not the case, it can be taken care of in the implementation of the algorithm.

The new algorithm takes an iterative approach. In each iteration, it maintains a row partition M and a basic solution B of OLP[M] such that the "fractional," defined hereinbelow, segments of M regarding to B are singletons. Then the algorithm tries to refine M through solving a smaller linear program that is constructed based on a row partition. The new algorithm reduces the memory usage by the third party linear program solver dramatically. Generally speaking, the memory usage of a third party solver will not be a bottleneck for the new algorithm. It opens the door to using less powerful but robust other third party linear solvers.

In the next several subsections, some necessary notions and a few atom operations or subroutines are introduced that act as the building blocks of the main algorithm.

Account Level Linear Program Formulation.

Denote the linear relaxation of the account level formulation as the original linear program (OLP) that is stated here:

OLP:

$$\text{maximize} \sum_{ij} p_{ij} x_{ij}$$

Subject to $$\sum_j x_{ij} = 1, i \in I, \quad \text{(i)}$$

$$\sum_{ij} a_{ij}^s x_{ij} \le b_s, s \in G, \quad \text{(ii)}$$

$$x_{ij} \ge 0 \text{ for } \forall i \in I, \forall j \in T.$$

where I is the index set of accounts, T the index set of treatments, and G the index set of global constraints.

Reformulate the OLP by adding a penalty variable to each global constraint as follows:

$$\text{maximize} \sum_{ij} p_{ij} x_{ij} - \sum_s p_s y_s$$

Subject to $$\sum_j x_{ij} = 1, i \in I, \quad \text{(i)}$$

$$\sum_{ij} a_{ij}^s x_{ij} - y_s = b_s, s \in G, \quad \text{(ii)}$$

$$x_{ij} \ge 0 \text{ for } \forall i \in I, \forall j \in T \text{ and } y_s \ge 0, s \in G.$$

where each $p_s$ is an extreme large positive number acting as the penalty weight to a non-satisfied global constraint. OLP can still be used to denote this formulation. Both formulations are equivalent if the first formulation has a solution. But the second formulation has the advantage that it always has a solution. The algorithm stated in this document uses the second formulation as its input format.

The Linear Program from a Row Partition.

Let MAXSIZE be a positive constant integer that represents the maximum size of a segment in a row partition. Set it as 1000 for now.

Let $M = \{M_1, M_2, \ldots M_k\}$ be a row partition of the entire input row records (or input accounts). Let $|M_q|$ denote the cardinality of $M_q$ or the frequency of $M_q$. If a segment contains only one element, then it is called a singleton. Again let T be the index set of possible treatments. Let $$u_{qj} = 1/|M_q| \sum_{i \in M_q} p_{ij} \text{ and } w_{qj}^s = 1/|M_q| \sum_{i \in M_q} a_{ij}^s \text{ where } p_{ij} \text{ and } a_{ij}^s$$

are the same as in *OLP*.

Let OLP[M] denote the following linear program, a segment formulation based on M:

OLP[M]:

$$\text{maximize} \sum_{q=1}^{k} \sum_{j \in T} u_{qj} y_{qj} - \sum_s p_s y_s$$

Subject to $$\sum_j y_{qj} = |M_q|, q = 1, 2, \ldots, k, \quad \text{(i)}$$

$$\sum_{q=1}^{k} \sum_{j \in T} w_{qj}^s y_{qj} - y_s = b_s, s \in G, \quad \text{(ii)}$$

$$y_{qj} \ge 0 \text{ for } q = 1, 2, \ldots, k \text{ and } \forall j \in T, y_s \ge 0, s \in G.$$

Let B be a solution of OLP[M]. It is called a basic solution if the components of B can be partitioned into two parts: basic and non-basic. The non-basic components are zeros, for the problems herein, and the columns of the coefficient matrix of OPL[M] corresponding to the basic components, or basic variables, forms a maximal independent set (as independent vectors). A basic solution exists (refer to Vasek Chvata. *Linear Programming*. W. H. Freeman and Company, 1980). Such concept is critical to the algorithm for obtaining an optimal solution. Let B be a basic solution of OLP[M]. For a segment $M_q$ in M, let bvidex($M_q$)={j| if $y_{qj}$ is a basic variable in B}. It is called the basic treatment index set of $M_q$. If bvidex($M_q$) has more than one element, then $M_q$ is called a "basic fractional" (in short, "fractional") segment regarding to B. The "re-balancing" operation on M defined hereinbelow is for these non-fractional segments, i.e. their basic treatment index set containing only one element. This operation makes the size of a non-fractional segments in check. Let ⌈d⌉ denote the smallest integer that is greater than or equal to d where d is a real number.

Re-Balancing(M,B):

```
Repeat {
        if there is a non-fractional segment M_q of M whose size
        is greater than
                MAXSIZE, split it into ⌈|M_q|/MAXSIZE⌉ segments as
                equal as possible; set
                the basic treatment index set of each new segment
                to be bvidex(M_q ).
                Delete M_q from M. Add the newly created segments to M.
} until no segment meeting the "if" condition".
Repeat {
        if the sum of their sizes of two non-fractional segments
        of M is less than or
        equal to MAXSIZE and their basic treatment index sets
        are the same, then
        merge them into a new segment. Set the basic treatment
        index set of the
        new segment to be the basic treatment index set of the
        two selected
        segments. Delete the two selected segments from and add
        the new one to M.
        } until no more segments meeting the "if" condition.
Return M.
```

Note that all the balancing operations are performed on these non-fractional segments. After re-balancing, a new row partition is produced. For this newly created row partition, the following routine computes a basic solution of OLP [Re-balancing(M,B)] from B.

Basis-Balancing(Re-balancing(M,B),B):

```
Let B={x_{ij},y_s}, M={M_1,M_2,...,M_k} and
Re-balancing(M,B)={W_1,W_2,...,W_n}.
Set y_{qj} =(|W_q|/|M_i|)x_{ij} if there is i such that W_q⊆M_i, otherwise
y_{qj} = Σ x_{ij} for q = 1,2,...,n and j ∈ T.
    M_i ⊂ W_q
Return {y_{qj},y_s}.
```

The following operation/subroutine expands a row partition M to a new one by replacing a segment $M_q$ of M with the individual records it contains.

Expanding(M, $M_q$):
  Remove $M_q$ from M and add each element of $M_q$ as a segment to M. Return M.
  Let $B=\{v_{qj}, y_s\}$ be a basic feasible solution of OLP[M] and $M_q$ is a non-fractional segment regarding to B. Let $S(M, M_q)$ be the set of singletons in Expanding(M, $M_q$). Let M* denote the set of these non-singleton segments of Expanding(M, $M_q$). Define OLP[M, $M_q$,B] to be the linear program deduced from OLP[M] and OLP as follows:

OLP[M, $M_q$,B]:

$$\text{maximize} \sum_{h \in S(M,Mq)} \sum_{j \in T} p_{hj} z_{hj} - \sum_{s \in G} p_s y_s + \sum_{h \in M^*} \sum_{j \in T} u_{hj} v_{hj}$$

Subject to $$\sum_j z_{hj} = 1, \forall h \in S(M, Mq), \quad \text{(i)}$$

$$\sum_{h \in S(M,Mq)} \sum_{j \in T} a^s_{hj} z_{hj} - y_s = b_s - \sum_{h \in M^*} \sum_{j \in T} w^s_{hj} v_{hj}, s \in G, \quad \text{(ii)}$$

$z_{hj} \geq 0$ for $\forall h \in S(M, Mq)$ and $\forall j \in T$, $y_s \geq 0$, $s \in G$.

It should be appreciated that OLP[M,$M_q$,B] is defined on S(M,$M_q$). It can be viewed intuitively that OLP[M,$M_q$,B] is obtained by projecting OLP[M] onto S(M,$M_q$). It has a feasible solution (if let $z_{hj}=(1/|Mq|)v_{qj}$ for h $\in$Mq and $z_{hj}=v_{hj}$ if h$\in$S(M,$M_q$) and h $\notin M_q$, a feasible solution is obtained and it has the same objective value as B).

Let W=expanding(M, $M_q$) and B', a basic solution of OLP [M,$M_q$,B]. Let Basis(W, OLP[M, $M_q$,B]) denote $\{v_{hj}|h$ in M*$\} \cup B'$. It can be shown that Basis(W, OLP[M, $M_q$,B]) is a basic solution of OLP[W]. The notation is used in the main algorithm, described hereinbelow.

Row Partition Based on a Basic Solution.

If M is the trivial row partition, i.e. each segment contains one account, then by the same notation used in the previous subsection, OLP=OLP[M]. From now on the account-level formulation can be viewed as nothing else but a special case of the row partition or segment formulation.

Let M be a row partition. Let $B=\{x_{ij},y_s\}$ be a basic solution of OLP[M]. For each segment, it has a basic treatment index set as defined in the previous subsection based on B. Every non-basic component of B is zero. Now the following operation or subroutine that generates a row partition based on B can be stated as follows:

Segments(M,B):
(1) Expand all fractional segments of M regarding to B to singletons;
(2) Partition the non-fractional segments of M into subsets such that any two segments belong to the same subset if their basic treatment index sets are the same (containing only one element). Merge the segments in each subset to form a new segment.
(3) Return the segments newly created in (1) and (2).

It should be appreciated that the merger operation is only performed on the non-fractional segments regarding to B. Based on this fact, the following subroutine computes a basic solution of OLP[Segments(M,B)]:

Basis_Micro(M,B):
  Let $B=\{x_{ij},y_s\}$ be a basic solution of OLP[M]. Let Segments(M,B)=$\{W_1,W_2,\ldots,W_k\}$ and M=$\{M_1,M_2,\ldots,M_n\}$
  For each segment $W_q$, if $W_q$ is also a segment of M with index i, set $y_{qj}=x_{ij}$ otherwise set $y_{qj}=\Sigma x_{ij}$.

$M_i \subset W_q$

Return B*=$\{y_{qj},y_s\}$.

Disaggregating a Segment Level Solution.

Let M be a row partition and B=$\{v_{ij},y_s\}$ an optimal solution of OLP[M]. Again let I/be the index set of accounts and T the index set of treatments. Let P be the index set of segments of M. Below is an example sub-routine to disaggregate B to a solution of OLP in the following:

DisAggregating(M,B):
  Compute the map f from I to P such that f(i)=q if i belongs the segment $M_q$ indexed by q.
  Compute U(B)=$\{u_{ik}=v_{f(i)k}/|M_{f(i)}| | i \in I, k \in T\}$.
  Return U(B) plus $\{y_s\}$.

Computing an Initial Basic Solution of OLP.

In this subsection, a method to compute a basic solution of OLP is proposed.

InitialBase(OLP):
  Generate a row partition M (can use a Mont Carlo method);

Solve OLP[M];

---

Let B be the returned basic solution of OLP[M].
Let W be the row partion computed as follows:
For each segment Q in M {
    If Q is non-fractional regarding to B {
        Add Q to W;
    } else {
        Add each element of Q as a singleton segment to W
        (i.e. expanding
        Q);
    }
}

---

In OLP[W], for each non-singleton segment Q, fix its treatment assignments to the same value as in B (this means to introduce more constraints).
Solve OLP[W] with the additional constraints.
Let B* be the returned basic solution.
Return DisAggregating(W,B*);

In an example prototype of the algorithm, the very first row partition is generated in the following way:

Without considering the global constraints, assign the best treatment for each row record or account. Then partition the row records or accounts according to their treatments assigned such that two row records are in the same subset if they have the same treatment assigned. Then balance the row partition to produce a desirable row partition.

The size of the linear programs in the subroutine can be controlled by the maximum size of a segment along with the fact that there are only a few fractional segments regarding to a basic solution. This means that the linear program OLP[W] is not that big and can be solved efficiently by a third party linear program solver.

The Algorithm.

The algorithm starts with a basic solution of OLP, solves, by calling a third party linear program solver, a sequence of linear programs and arrives at a solution of OLP. If the third party solver returns an optimal and basic solution in each call, then the algorithm will return an optimal solution to OLP. As a by-product, it also finds an optimal row partition, i.e. the optimal solution of the linear program based on this row partition can be converted or disaggregated to an optimal solution of OLP.

Figure 4:
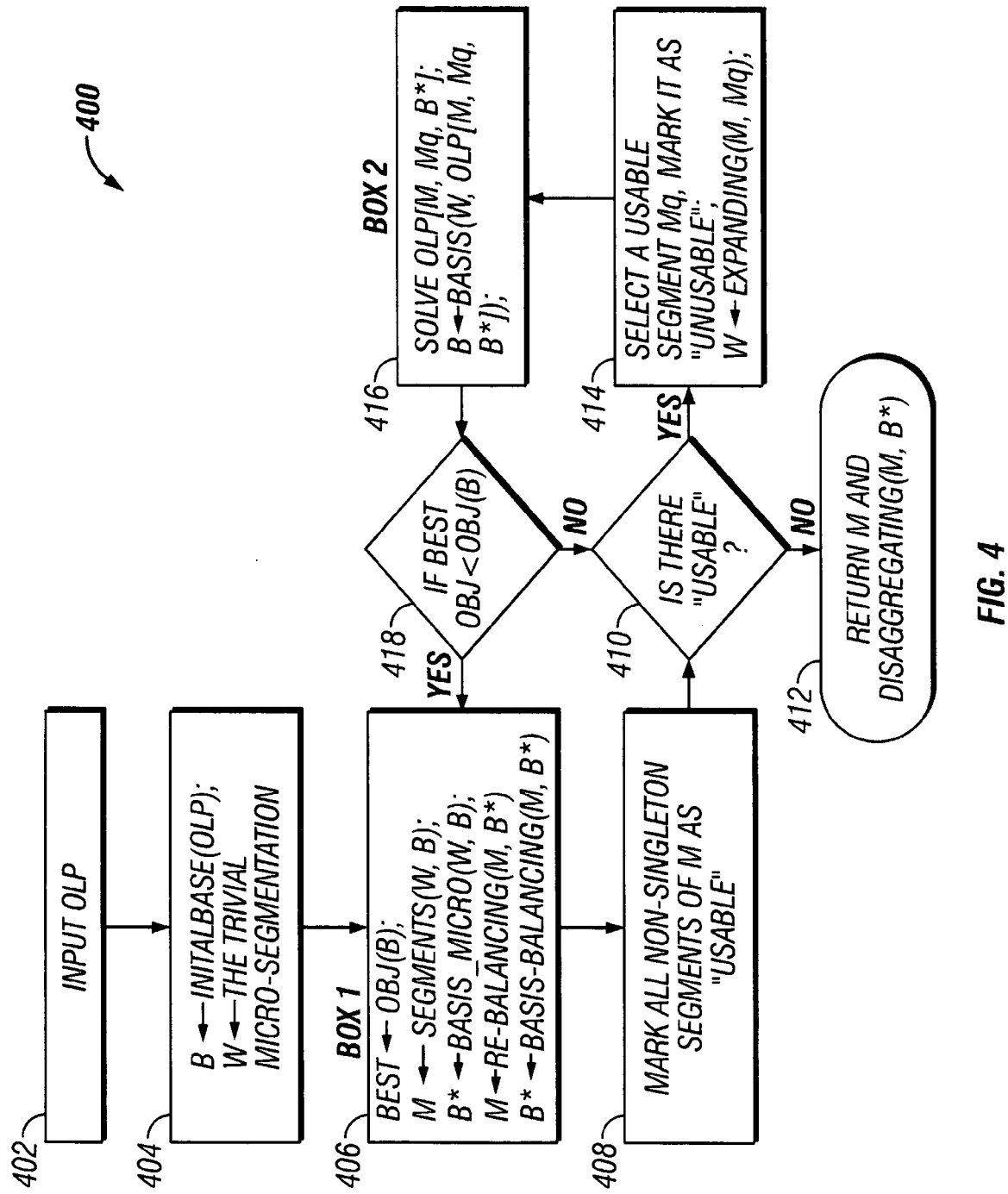
FIG. 4 is a detailed flow diagram of the scalable exact algorithm according to the invention.

The algorithm can be described with reference to FIG. 4, a workflow diagram for the algorithm, along with the corresponding pseudo-code presented hereinbelow. The algorithm is referred to herein as Zheng Account-Segment-Generation Algorithm (ZASGA). ZASGA works for the soft constraint setting, i.e. the penalty weights may be set to be relatively smaller in considering the trade-of between the global constraints and the business objective, as well. For initial input, OLP is computed by, for example, Fair Isaac Corp.'s Decision Optimizer, using account level information 402. The output of the algorithm is a row partition and a solution of OLP 412. The returned solution is optimal or not totally dependent on the solver ZASGA calls as indicated above.

ZASGA Pseudo-Code:

```
Input: OLP computed by using account level information 402.
Output: A row partition and a solution of OLP 412.
Data Object Definition:
    B: A double array to store a basic solution.
    B*: A double array to store a basic solution.
    M,W: Vector of sets to store segmentations.
    Obj(B): a double to store the objective value computed
    using a basic solution B.
    BestObj: a double, the best objective value computed so far,
    initialized to the minus infinity.
    Mark: Boolean array with the same length as M to represent
    the "usable" and "unusable"
    segments information.
    MAXSIZE: a constant integer representing the maximum size
    of a segment.
    NUMITERATIONS: set to be a large integer, it is the limit
    of possible iterations of the major loop
Algorithm Body:
    B←InitialBase(OLP) 404.
    W ← the trivial row partition-- each segment is a
    singleton 404;
    iternum←0 406;
    While ( iternum < NUMITERATIONS) {
    // begin-while
        iternum←iternmu+1;
        If (BestObj<Obj(B) 418) {
            BestObj← the objective value of B;
            M←Segment(W,B) 406
            B*←Basis_Micro(W,B) 406;
            M←Re-balancing(M,B*) 406;
            B*←Basis-balancing(M,B*) 406;
            For (each segment i ) {
                if it is not single-ton, Mark[i]=true 408; //usable
                else Mark[i]=false 408;        //unusable
            }
        }
        If (there is a usable segment) 410 {
            Select a usable segment M_q from M 414;
            Mark[q]=false 414;
            W←Expanding(M, M_q) 414;
            Compute OLP[M, M_q ,B*] 416;
            Solve OLP[M, M_q ,B*] 416;
            Compute B=Basis(W, OLP[M, M_q ,B*]) using
            the returned basic solution of OLP[M, M_q ,B*] and
            B* 416;
        } else 410{
            Return M and disAggregating(M,B*) 412;
        }
    } // end-while 418
```

It should be appreciated that the method assumes that the input linear program is not degenerated. In the case if the input linear program is degenerated and the solver called within the method returns a basic optimal solution, in order to guarantee an optimal solution of the original linear program, one more book-keeping step needs to be added: i.e. after last 416, disaggregating the basic solution B=Basis(W, OLP[M, $M_q$, B*] to obtain a basic solution of the original linear program, say B^. If B^ is different from the current best solution, but its objective value may be the same as that of the current best solution, i.e. keep, W and B. Then before exiting the method, check if there are stored W and B. If yes, replace the current solution and row partition by the stored B and W and go to 406. Otherwise exit the method.

To reference detailed proofs of the steps of the algorithm hereinabove, refer to the internal paper of Fair Isaac Corporation to Maolin Zheng, *A Scalable Exact Algorithm For Decision Optimization (Revised Version)*, July 2005, which paper is incorporated herein by this reference thereto.

It should be appreciated that the operation/subroutine Re-balancing(M) keeps all intermediate linear programs in the algorithm to a predictable size. Such is very important for the scalability of the algorithm. Also in the algorithm, only one non-singleton is selected to expand in each iteration. Actually several such segments can be selected to expand at the same time in order to reduce the number of total iterations if there is enough computer memory permitting to do so.

It should be appreciated that if the solver called in operation "Solve OLP[M, $M_q$,B*]" 416 returns a basic optimal solution of the sub-linear program OLP[M, $M_q$,B*], then the algorithm returns an optimal solution of OLP, the original linear program.

Solving Mixed Integer Programs.

In one embodiment of the invention, a large consumer decision problem is formulated as 0,1-linear program (if restricting all the decision variables in OLP as 0,1) and propose an algorithm to solve its linear relaxation.

Take M and B=disAggregating(M,B*) from the return of ZASGA, if B contains no fractions, then B is an integer solution to the large consumer decision problem. Otherwise, all the fractional segments are singletons. It can be proven that there are at most |G| such fractional numbers in B where |G| is the number of global constraints. To reference the detailed proofs, refer to the internal paper of Fair Isaac Corporation to Maolin Zheng, *A Scalable Exact Algorithm For Decision Optimization (Revised Version)*, July 2005, which paper is incorporated herein by this reference thereto. For example, if there are 2 million accounts and 4 global constraints, the result is at most 4 accounts with fractional assignments. By rounding these fractions to their nearest integer, an integer solution is obtained. It might be not optimal or feasible. But the error is relatively smaller comparing with the scale of the problem. Another way of obtaining an integer solution is to solve OLP[M] by calling an MIP solver of a third party and disaggregate the solution to an account level solution. Because OLP[M] is relatively small, the MIP solver shall solve it. The disaggregated solution might not be optimal but shall be very good. The quality of the solution, optimal or not, is dependent on the solver called in the algorithm.

EXAMPLE RESULTS

Table A shows the results of using the computer environment: 1.2 GHz CPU, 1.2 GB RAM, Windows 2000 and applying 12 treatments and 4 global constraints for all runs.

TABLE A

| Solver | Samples | Objective | Time |
| --- | --- | --- | --- |
| New w/Dash | 50,000 | 83,631,553.2 | 1 m 33 s |
| Lagrange | 50,000 | 83,631,553.2 | 4 m 28 s |
| Dash | 50,000 | 83,631,553.2 | 51 m 00 s |
| New w/Dash | 125,000 | 82,339,137.2 | 5 m 07 s |
| Lagrange | 125,000 | 82,329,800.0 | 32 m 39 s |
| Dash | 125,000 | Did Not Complete | |
| New w/Dash | 175,000 | 165,908,040.4 | 3 m 26 s |
| Lagrange | 175,000 | 165,908,040.4 | 22 m 48 s |
| Dash | 175,000 | Did Not Complete | |

Table B shows the results of using the computer environment: 1.2 GHz CPU, 1.2 GB RAM, Windows 2000 and applying 12 treatments and 4 global constraints for all runs.

TABLE B

| Solver | Samples | Objective | Time |
|---|---|---|---|
| New w/Dash | 500,000 | 465,092,193.38 | 27 m 23 s |
| New w/Dash | 1,000,000 | 930,184,386.76 | 1 h 44 m 38 s |

It is evident from the discussion and results shown hereinabove that benefits to an enterprise using the method and process provided herein include more samples translate to better precision for projects, for example better forecasts, increased constraint satisfaction, and increased client satisfaction and conversion rates. More segments translate to better differentiation of treatments, for example better forecasts, reduced model and prediction error, and increased client satisfaction and strategy control.

It should be appreciated that in one embodiment of the invention performs the operations in a parallel manner. It is possible to split the processing of an inner loop into threads that independently run the expand and solve operations.

Another embodiment of the invention uses alternative selection algorithms for finding the usable segment in which to expand.

Another embodiment of the invention uses alternative algorithms for seeding the basic feasible solution.

Another embodiment of the invention tunes the cache size used to feed the LP solver.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for generating a tangible machine-readable record representing a solution for a decision optimization problem corresponding to a marketing campaign of an enterprise, the method performed by one or more computer processors based on a plurality of computer instructions, the instructions comprising:

initiating, by one or more of the computer processors, a determination of a global solution to a decision optimization problem applied to a set of original account data representing real world entities associated with the marketing campaign, the set of account data including multiple rows where each row represents an account, where the problem includes at least one sub-problem posed to every account and the problem also includes global constraints acting on all accounts;

preparing, by one or more of the computer processors, an initial solution to the decision optimization problem, the initial solution including a sub-solution to the sub-problem for each account, and setting the initial solution as a current solution, the current solution being assigned without considering the global constraints acting on all accounts;

establishing, by one or more of the computer processors, a row partition grouping the rows data into segments based on said current solution, each segment representing an aggregation of rows, a first portion of the segments being non-fractional segments and a second portion of the segments being fractional segments, the fractional segments comprising more than one element and the non-fractional segments comprising only one element;

balancing, by one or more of the computer processors, said row partition at least by partitioning any non-fractional segments larger than a predetermined size and, at least by combining any pair of two non-fractional segments wherein the pair's size is smaller than the predetermined size;

expanding, by one or more of the computer processors, one or more selected non-singleton segments of said balanced row partition that are not already designated as expanded, and designating the selected segments as expanded, the non-singleton statements each containing more than one element;

computing, by one or more of the computer processors, a new solution to the decision optimization problem as presented by the partitioned, balanced, and expanded account data, where the new solution includes (1) a sub-solution to the sub-problem for each account of the expanded segments, and (2) a sub-solution to the sub-problem for each segment other than the expanded segments;

determining, by one or more of the computer processors, if said new solution is nearer to an optimal solution than the current solution, if YES, then designating the new solution to be the current solution, and repeating the establishing, balancing, expanding, and computing operations using rows of the partitioned, balanced, and expanded partition instead of the rows of the original account data, if NO, performing the following: (1) if there are any non-singleton segments in said balanced row partition not designated as expanded, then repeating the expanding and computing operations; (2) if all non-singleton segments of said balanced row partition have been designated as expanded, then storing a database comprising a machine-readable record of a latest version of new solution.

2. The method of claim 1, wherein said initial solution is a basic solution B of an original linear program (OLP).

3. The method of claim 1, wherein said operation of establishing a row partition comprises operations of:

generating a row partition, M, based on said current solution and said balanced and expanded row partition by merging segments having the same sub-solution into one segment.

4. The method of claim 1 where the operation of storing a machine-readable record of the latest version of new solution further comprises:

disaggregating said current solution.

5. The method of claim 1, where the operation of expanding one or more selected non-singleton segments comprises:

selecting a non-singleton segment that is not designated as expanded, $M_g$, designating $M_g$, as expanded, and expanding $M_g$ by removing $M_g$ from said balanced row partition and adding each element of $M_g$ to the balanced, expanded row partition as a segment.

6. The method of claim 1, where the operation of storing a database comprising a machine-readable record of a latest version of new solution comprises:

returning an optimal solution of an original linear program.

7. A computer implemented method for generating a tangible machine-readable record representing a solution for a decision optimization problem corresponding to a marketing campaign of an enterprise, the method performed by one or more computer processors based on a plurality of computer instructions, the instructions comprising:

assigning, by one or more of the computer processors, a best treatment for each row record associated with a plurality of accounts without considering global restraints relating to all accounts, the row record containing data associated with the marketing campaign;

partitioning, by one or more of the computer processors, the row records according to their assigned treatments such that two row records are in a same partition if they have the same assigned treatment;

balancing, by one or more of the computer processors, the row partitions at least by partitioning any non-fractional segments larger than a predetermined size and, at least by combining any pair of two non-fractional segments wherein the pair's size is smaller than the predetermined size;

applying, by one or more of the computer processors, a Zheng Account-Segment-Generation algorithm to the balanced row partitions order to determine the solution; and, generating, by one or more of the computer processors, a machine-readable record corresponding to the solution.

8. A computer implemented method for generating a tangible machine-readable record representing a solution for a decision optimization problem corresponding to a marketing campaign of an enterprise, the method performed by one or more computer processors based on a plurality of computer instructions, the instructions comprising:

computing, by one or more of the computer processors, an initial solution of an input problem associated with the marketing campaign;

setting, by one or more of the computer processors, the initial solution as a current solution;

finding, by one or more of the computer processors, a first row partition from a plurality of accounts that is based on the current solution, the accounts being associated with the marketing campaign;

balancing, by one or more of the computer processors, the first row partition at least by partitioning any non-fractional segments larger than a predetermined size and, at least by combining any pair of two non-fractional segments wherein the pair's size is smaller than the predetermined size;

marking, by one or more of the computer processors, all non-singleton segments in the first row partition as non-expanded;

determining, by one or more of the computer processors, whether any of the segments in the first row partition are usable;

if there are usable segments in the first row partition, select a limited number of such segments and expand such segments into singletons to generate a second row partition;

applying a solver to the second row partition to generated a solution for the second row partition;

determining, by one or more of the computer processors, if the solution for the second row partition provides an improved solution as compared to the current solution;

marking, by one or more of the computer processors, the solution of the second row partition as the current solution if it is determined that the solution for the second row partition provides an improved solution; and generating, by one or more of the computer processors, a machine-readable record corresponding to the current solution.

* * * * *